United States Patent Office 3,696,052
Patented Oct. 3, 1972

3,696,052
CATALYST FOR EPOXIDATION PROCESS
John F. Harrod, Mont St. Hilaire, Quebec, Allan R. Knight, Petrolia, Ontario, and John S. McIntyre, Sarnia, Ontario, Canada, assignors to The Dow Chemical Company, Midland, Mich.
No Drawing. Continuation-in-part of application Ser. No. 4,037, Jan. 19, 1970, now Patent No. 3,654,317. This application June 2, 1971, Ser. No. 149,377
Int. Cl. C07d 1/08, 1/12
U.S. Cl. 252—428          6 Claims

ABSTRACT OF THE DISCLOSURE

A process for producing epoxides comprising oxidizing in the liquid phase an olefin via an organic hydroperoxide in the presence of at least one of $Mo(CO)_6$ and $W(CO)_6$ as a catalyst, wherein a solution of the olefin and the catalyst have been heated to a temperature of from 50° C. to the reflux temperature of the olefin for at least 5 minutes prior to the epoxidation. The resulting activated catalyst allows epoxidation reactions at lower temperatures or shorter contact times, thereby lowering hydroperoxide losses through decomposition.

This is a continuation-in-part of our copending application, Ser. No. 4,037, filed Jan. 19, 1970, now Patent No. 3,654,317.

BACKGROUND OF THE INVENTION

Olefin oxide, or epoxy, compounds are an important chemical commodity and the subject of a great deal of research. It is well known in the art that the most sought after epoxides, ethylene oxide and propylene oxide, are difficult to form directly from the corresponding olefin.

Ethylene oxide can be commercially produced by the direct vapor phase oxidation of ethylene over a silver catalyst. But this method, while widely used for producing ethylene oxide, is not applicable to propylene oxide or other epoxides.

Propylene oxide may be formed by the chlorohydrin route, i.e., propylene is reacted with hypochlorous acid to form propylene chlorohydrin, which is then dehydrochlorinated to form propylene oxide. However, this route is costly and yields a product containing undesired impurities which are difficult to separate from the epoxide.

A further epoxidation route which has been developed is the peracid reaction. Hydrogen peroxide and a carboxylic acid are reacted to form a peracid, and the peracid utilized to epoxidize an olefin, the peracid being reduced to the corresponding acid. There are a number of drawbacks to such a route, including the dangerous, expensive and corrosive nature of the reagents involved, their non-regenerability ($H_2O_2$ goes to $H_2O$), and the many by-products formed in the reaction.

A relatively recent development for the production of epoxides is via organic hydroperoxides. An olefin and a hydroperoxide are reacted to form the olefin oxide and the corresponding alcohol.

Initially no catalysts were used in this reaction, but some metal acetylacetonates and certain hexacarbonyls have emerged as catalysts. However, relatively long reaction times and/or high temperatures, which lead to the degradation of the hydroperoxides, are still required.

SUMMARY OF THE INVENTION

The invention is a process for oxidizing olefins to their corresponding epoxides which comprises (1) heating a solution of the olefin and at least one of $Mo(CO)_6$ and $W(CO)_6$ from about 50° C. to the reflux temperature of the olefin (preferably 90° C. to the reflux temperature) for at least about 5 minutes, preferably about 20 minutes, and (2) oxidizing the olefin in the liquid phase with an organic hydroperoxide at a temperature of from —40° C. to 200° C. in the presence of the activated catalyst of Step (1).

The activated catalyst resulting from the initial step of the process allows the utilization of lower temperatures or shorter contact times in the epoxidation reaction, with at least about equivalent conversions, thereby lowering hydroperoxide losses through decomposition while maintaining satisfactory process results.

The general method of oxidizing olefins via an organic hydroperoxide is known to those skilled in the art. For instance U.S.P. 3,350,422 discusses this process. The following outlines the reagents and process parameters.

Olefins

The improved epoxidation reaction of this invention is generally applicable to olefinically unsaturated materials including substituted and unsubstituted aliphatic and alicyclic olefins and polyolefins, such as hydrocarbons, esters, alcohols, ketones, ethers, and the like, and halogenated derivatives of the above. Preferred compounds are those containing from 2 to about 20 total carbon atoms. Also suitable are olefinically unsaturated polymers having up to about several thousand carbon atoms.

Illustrative of the above are olefins such as ethylene, propylene, n-butylene, isobutylene, the pentenes, the methyl pentenes, n-hexene, octenes, dodecenes, cyclohexene, cyclohexadiene, methyl cyclohexenes, butadienes, heptadienes, octadienes, styrene, methyl styrenes, vinyl toluenes, vinylcyclohexenes, phenyl cyclohexenes, allyl alcohol, methallyl alcohol, cyclohexenol, diallyl ether, methyl methacrylate, methyl oleate, methyl vinyl ketone, allyl chloride, linseed oil, olive oil, soybean oil, butyl-polyglycol esters of unsaturated fatty acids, polybutadiene, polyisoprene, and the like.

Hydroperoxides

Organic hydroperoxides which are suitable herein are those generally of the formula ROOH, where R is an organic radical such as substituted or unsubstituted alkyl, alkenyl, aralkyl, cycloalkyl, cycloalkenyl, hydroxycycloalkyl, and the like. R may generally contain from 3 to about 20 carbon atoms, and may be a heterocyclic radical.

Examples include the hydroperoxides of cumene, ethylbenzene, isobutane, isopentane, Tetralin, methylcyclohexane, toluene, p-ethyltoluene, isobutylbenzene, diisopropylbenzene, p-isopropyl toluene, o-, m- and p-xylene, phenylcyclohexane, 3,4-dihydrocoumarin, and cyclohexanone peroxide, methyl ethyl ketone peroxide, and the like.

The methods for preparing compounds such as the above are well known in the art. The source of said hydroperoxides is not critical herein.

Catalysts

The catalysts suitable herein include at least one of $Mo(CO)_6$ and $W(CO)_6$. The preparation of said catalysts is known, and their source is not critical herein.

Thermal pre-treatment

The improved properties of the catalyst are achieved by heating a solution of at least about $1 \times 10^{-4}$ moles per liter of olefin, and preferably $1 \times 10^{-3}$ moles, of one or a mixture of the above described catalyst in one of the above olefins to a temperature of from about 50° C. to the reflux temperature of the olefin employed, and preferably from about 90° C. to the reflux temperature, for at least about five minutes, preferably 20 minutes.

An inert solvent may be incorporated into the catalyst-olefin mixture before preheating if desired. Suitable solvents include aliphatic, naphthenic and aromatic hydrocarbons, and their oxygenated derivatives, such as xylene, toluene, octane, naphthalene, methylbenzoate, and the like.

It has been found that preheating a more dilute catalyst solution for a longer period of time will give almost as fast a reaction rate as preheating a more concentrated solution for shorter times. Therefore, the choice of catalyst concentration and heating time may properly be determined by the relative cost of catalyst and thermal pre-treatment, rather than strictly by operability, resulting in desirable flexibility.

The method of operation after thermal pre-treatment is not critical to the enhanced activity of the catalyst, i.e., no appreciable difference can be seen between a catalyst mixture to which is immediately added the hydroperoxide, and one which is cooled, and even left standing for several hours, before use.

Epoxidation reaction

The general parameters of the process for oxidizing olefins via a hydroperoxide after thermal pre-treatment may vary quite widely. A reaction temperature may be selected from a broad range depending upon the activity of the catalyst system and other characteristics of the system. Generally from about −40° to 200° C. is suitable, while about 60° to 85° C. is preferred. The reaction is carried out in the liquid phase, and pressure conditions should be suitable to maintain this phase at the temperature used. Sub-, super- and atmospheric pressures may be utilized.

Generally, 0.5 to 100 moles of olefin per mole of hydroperoxide is suitable, while 5 to 10 are preferred.

A reaction time of from about one minute to one hour is suitable, while about 5 to 30 minutes is preferred.

The reaction may be carried out in an inert solvent such as those mentioned above, if desired. The reaction may suitably be carried out in a batch-wise fashion, or continuously.

The hydroperoxide may be added to the catalyst-olefin mixture incrementally, or in a single addition.

SPECIFIC EMBODIMENTS

The following experiments are intended to illustrate the effect of thermal pre-treatment and the period of said treatment on the rate of epoxidation. Although 2,4,4-trimethyl-1-pentene, t-butyl hydroperoxide and $Mo(CO)_6$ were used throughout for illustration, similar results are obtained with other combinations of those reagents heretofore enumerated.

In each case where pre-treatment was practiced, the indicated solutions were prepared (generally 100 mls. of olefin was used) and refluxed in a 250 ml. flask (olefin B.P. was 101° C.). The concentration of the catalyst was 1.25 millimoles/liter. Samples were withdrawn at the times indicated, and cooled on ice.

To the same olefin-catalyst solution was then added the hydroperoxide, a sample withdrawn, and the mixture heated immediately in a constant temperature bath of 60° C. The formation of the epoxide (1,2-epoxy-2,4,4-trimethyl pentane) was followed by vapor phase chromatography. Percent Epoxide Formation is based on hydroperoxide consumed.

The results and conditions for some representative runs are shown below:

|  | Run number | | |
| --- | --- | --- | --- |
|  | (1) | (2) | (3) |
| Period of pre-treatment (min.) | 0 | 15 | 30 |
| Reaction time (min.): | Percent epoxide formation | | |
| 0 | 9 | 5 | 7 |
| 5 | 11 | 49 | 53 |
| 10 | 11 | 64 | 75 |
| 15 | 12 | 74 | 85 |
| 20 | 14 | 82 | 90 |
| 25 | 18 | | |
| 30 | 20 | | |

We claim:

1. A process for preparing an activated catalyst which comprises heating a solution of an olefin and at least one of $Mo(CO)_6$ and $W(CO)_6$ from about 50° C. to the reflux temperature of the olefin for a time sufficient to cause the activation.

2. The process of claim 1 in which the activation is carried out in the presence of an inert solvent.

3. The process of claim 1 wherein the process is carried out at a temperature of from about 90° C. to the reflux temperature of the olefin.

4. The process of claim 1 wherein the solution is heated for a period of at least five minutes.

5. The activated catalyst of the process of claim 1.

6. The process of claim 1 wherein the olefin contains from 2 to about 20 carbon atoms.

References Cited

UNITED STATES PATENTS 3,351,635  11/1967  Kollar _____ 260—348.5 L
3,388,154  6/1968   Bitar et al. _____ 252—443 X
3,463,827  8/1969   Banks _____ 252—443 X PATRICK P. GARVIN, Primary Examiner U.S. Cl. X.R.

252—443; 260—348.5 L